(12) United States Patent
Lapensee

(10) Patent No.: US 9,150,065 B1
(45) Date of Patent: Oct. 6, 2015

(54) FIFTH WHEEL TRAILER HITCH ADAPTER

(71) Applicant: Dennis C. Lapensee, Wildomar, CA (US)

(72) Inventor: Dennis C. Lapensee, Wildomar, CA (US)

( * ) Notice: Subject to any disclaimer, the term of this patent is extended or adjusted under 35 U.S.C. 154(b) by 0 days.

(21) Appl. No.: 14/510,417

(22) Filed: Oct. 9, 2014

(51) Int. Cl.
*B60D 1/36* (2006.01)
*B60D 1/07* (2006.01)
*B60D 1/01* (2006.01)

(52) U.S. Cl.
CPC ............. *B60D 1/075* (2013.01); *B60D 1/015* (2013.01)

(58) Field of Classification Search
CPC ........... B60D 1/075; B60D 1/015; B60D 1/36
See application file for complete search history.

(56) References Cited

U.S. PATENT DOCUMENTS

| 5,788,257 | A | 8/1998 | Meyerhofer |
| 6,474,673 | B1 | 11/2002 | Biggins |
| 6,808,195 | B2 | 10/2004 | Smith |
| 7,988,176 | B2 | 8/2011 | Colibert et al. |

*Primary Examiner* — Kevin Hurley
*Assistant Examiner* — Gabriela C Craciun
(74) *Attorney, Agent, or Firm* — Crossley Patent Law

(57) ABSTRACT

A fifth wheel trailer hitch adapter permitting a fifth-wheel trailer hitch to be mounted outside a truck bed and coupled with a vehicle rear hitch so that neither the adapter nor any portion of a fifth-wheel trailer occupies any portion of the truck bed by including a wheeled L-shaped support frame with a vertical shaft having a telescopic inner shaft therein and a horizontal hitch frame telescopically coupled to the rear hitch, a solid wedge between the vertical shaft and the hitch frame, and a plate attached to the inner shaft by a plurality of braces to ensure structural integrity. The fifth-wheel trailer hitch mounts to a base attached atop the plate.

7 Claims, 5 Drawing Sheets

FIFTH WHEEL TRAILER HITCH ADAPTER

CROSS-REFERENCE TO RELATED APPLICATIONS

Not Applicable

FEDERALLY SPONSORED RESEARCH OR DEVELOPMENT

Not Applicable

INCORPORATION BY REFERENCE OF MATERIAL SUBMITTED ON A COMPACT DISK

Not Applicable

BACKGROUND OF THE INVENTION

Various types of trailer hitch adapters are known in the prior art. However, what is needed is a fifth wheel trailer hitch adapter which allows a fifth-wheel hitch to be mounted outside a truck bed and coupled with a rear hitch of a vehicle so that neither the adapter nor any portion of a fifth-wheel trailer occupies any portion of the truck bed.

FIELD OF THE INVENTION

The present invention relates to trailer hitch adapters, and more particularly, to a fifth wheel trailer hitch adapter.

SUMMARY OF THE INVENTION

The general purpose of the present fifth wheel trailer hitch adapter, described subsequently in greater detail, is to provide a fifth wheel trailer hitch adapter which has many novel features that result in a fifth wheel trailer hitch adapter which is not anticipated, rendered obvious, suggested, or even implied by prior art, either alone or in combination thereof.

To accomplish this, the present fifth wheel trailer hitch adapter is devised to allow a fifth-wheel hitch to be mounted outside a truck bed and coupled with a rear hitch of a vehicle so that the fifth wheel does not occupy any portion of the truck bed, in contrast to prior fifth wheel attachment devices that are mounted within and occupy, along with a portion of the fifth-wheel trailer, at least a portion of the truck bed. The fifth wheel trailer hitch adapter includes a wheeled L-shaped support frame having a hollow vertical shaft and a solid inner shaft telescopically disposed therein. Vertically-aligned apertures are centrally disposed through side walls of the inner shaft and a first lock pin selectively engages one of the apertures for height adjustment. A solid horizontal hitch frame of the support frame has a rear end disposed on a front wall of the vertical shaft proximal a bottom end thereof and also has a front end, an upper wall, and a pair of sideward walls. The hitch frame is perpendicular to the vertical shaft. Aligned holes are centrally disposed in the sideward walls along the hitch frame with one of the holes disposed proximal the front end. A second lock pin selectively engages one of the holes.

In addition to the support frame, a parallelepiped plate is disposed atop the inner shaft in a position parallel to the hitch frame. The inner shaft is centrally disposed on a bottom surface of the plate. A safety chain is attached to each of the side surfaces of the plate. A plurality of braces strengthens the attachment between the inner shaft and the plate, the braces being disposed on each of the side surfaces and rear surface. Each brace has a pair of upper ends disposed within the plate proximal each of the side surfaces to provide reinforcement. Each brace further has a v-shaped portion attached to the upper ends. The v-shaped portion has a pair of inner sides. A lower apex of the v-shaped portion is disposed on the respective side wall and a back wall of the inner shaft. A cross-brace is continuously disposed between the inner sides of the v-shaped portion to provide further reinforcement of the brace structure.

A base is disposed atop the plate. A fifth-wheel trailer hitch assembly is configured to couple to the base. The fifth-wheel trailer hitch assembly has a base component attached to the base and a head component configured to removably couple a fifth-wheel trailer. The base component is configured to support the head component. A solid brace wedge, which is disposed between the upper wall of the horizontal hitch frame and the front wall of the vertical shaft, strengthens the connection between the vertical shaft and the horizontal hitch frame. The horizontal hitch frame is configured to telescopically engage a vehicle rear hitch. The support frame, the plate, each brace, and the base are preferably formed of solid steel to ensure that the device has structural soundness to perform its functions.

The present device provides a more convenient use of a fifth wheel hitch, while also not occupying truck bed space, thereby permitting more hauling capacity in the truck bed than other fifth wheel hitches. Thus has been broadly outlined the more important features of the present fifth wheel trailer hitch adapter so that the detailed description thereof that follows may be better understood and in order that the present contribution to the art may be better appreciated.

BRIEF DESCRIPTION OF THE DRAWINGS

Figures

DETAILED DESCRIPTION OF THE DRAWINGS

Figure 1:
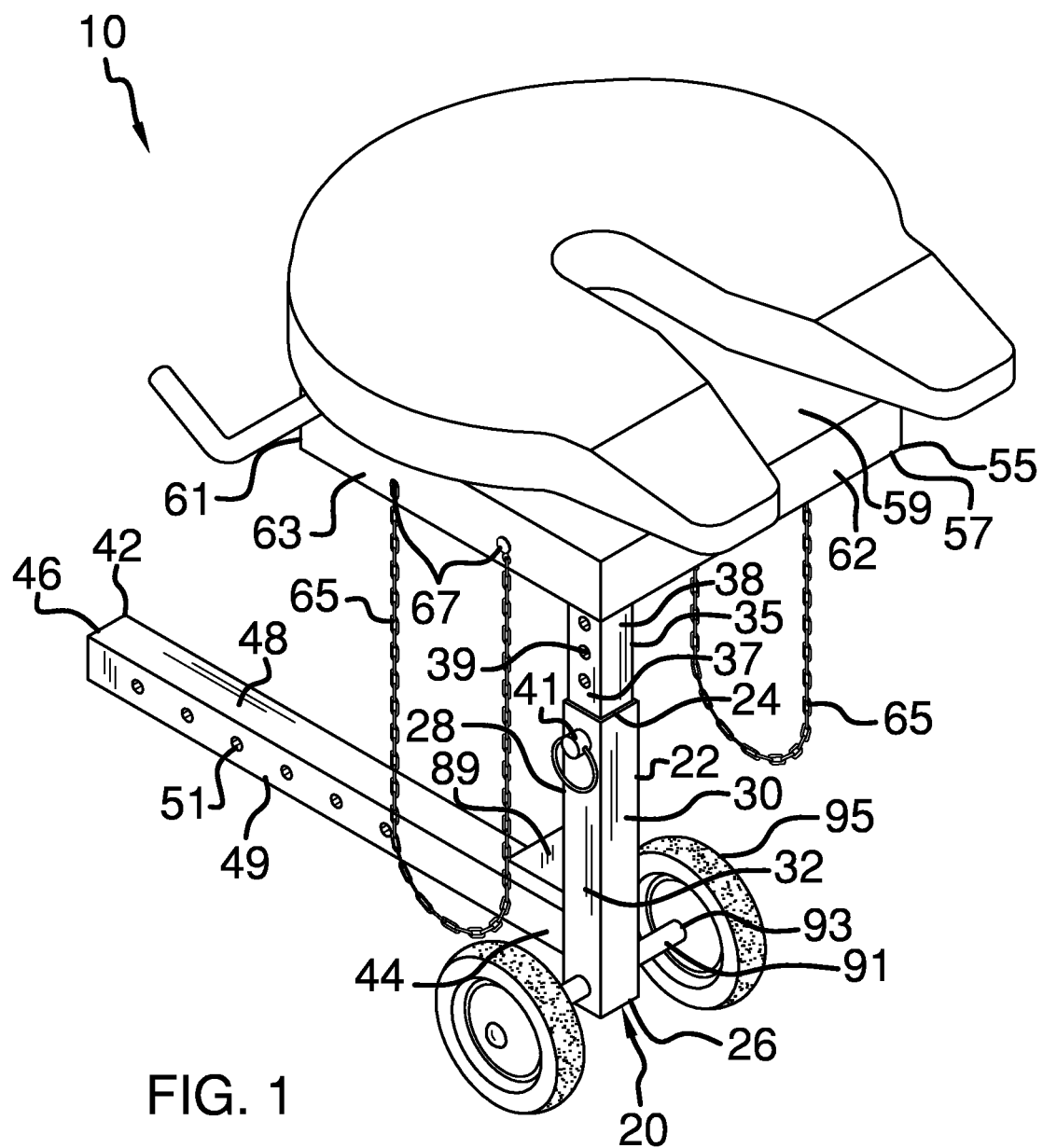
FIG. 1 is an isometric view.
Figure 2:
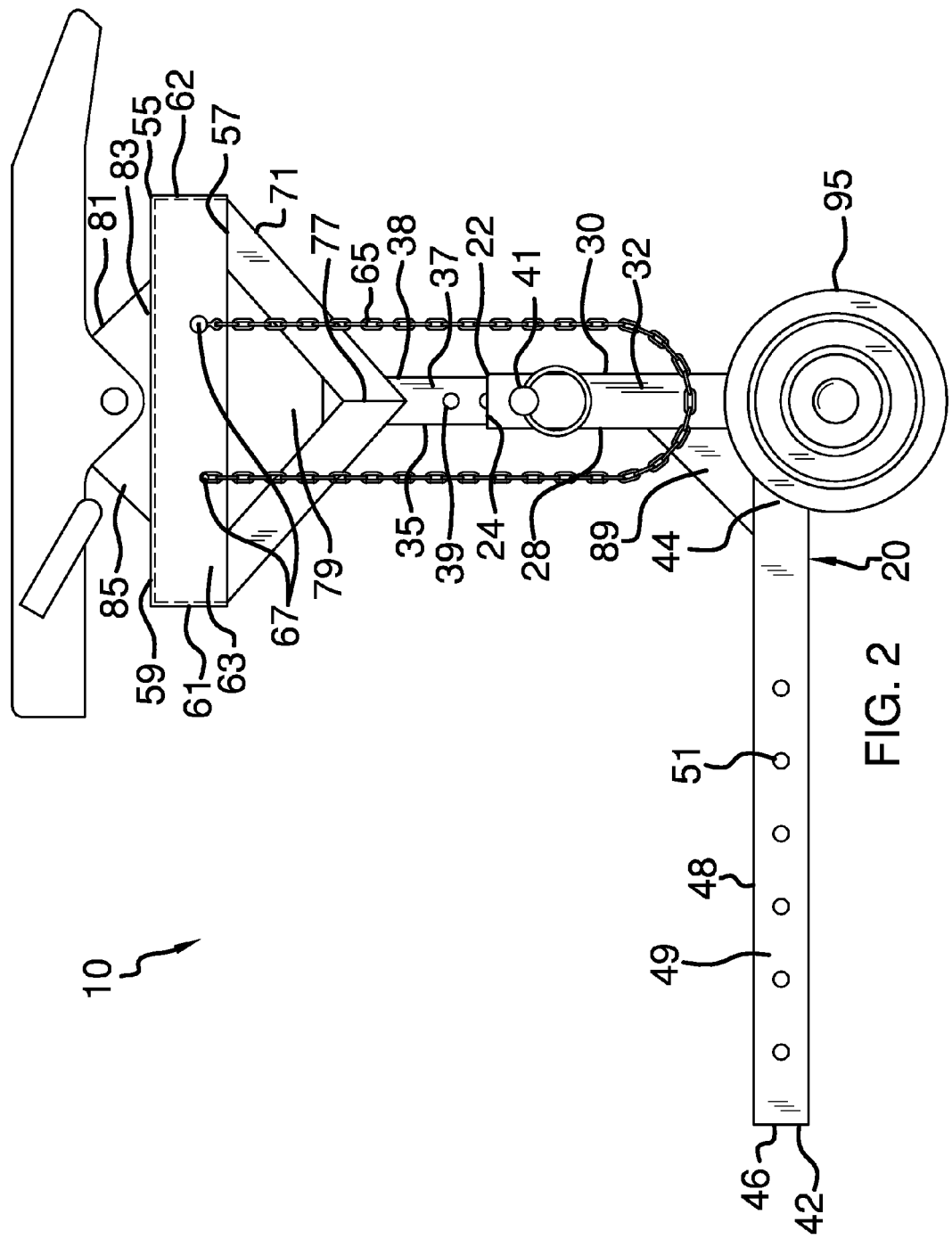
FIG. 2 is a side elevation view.
Figure 3:
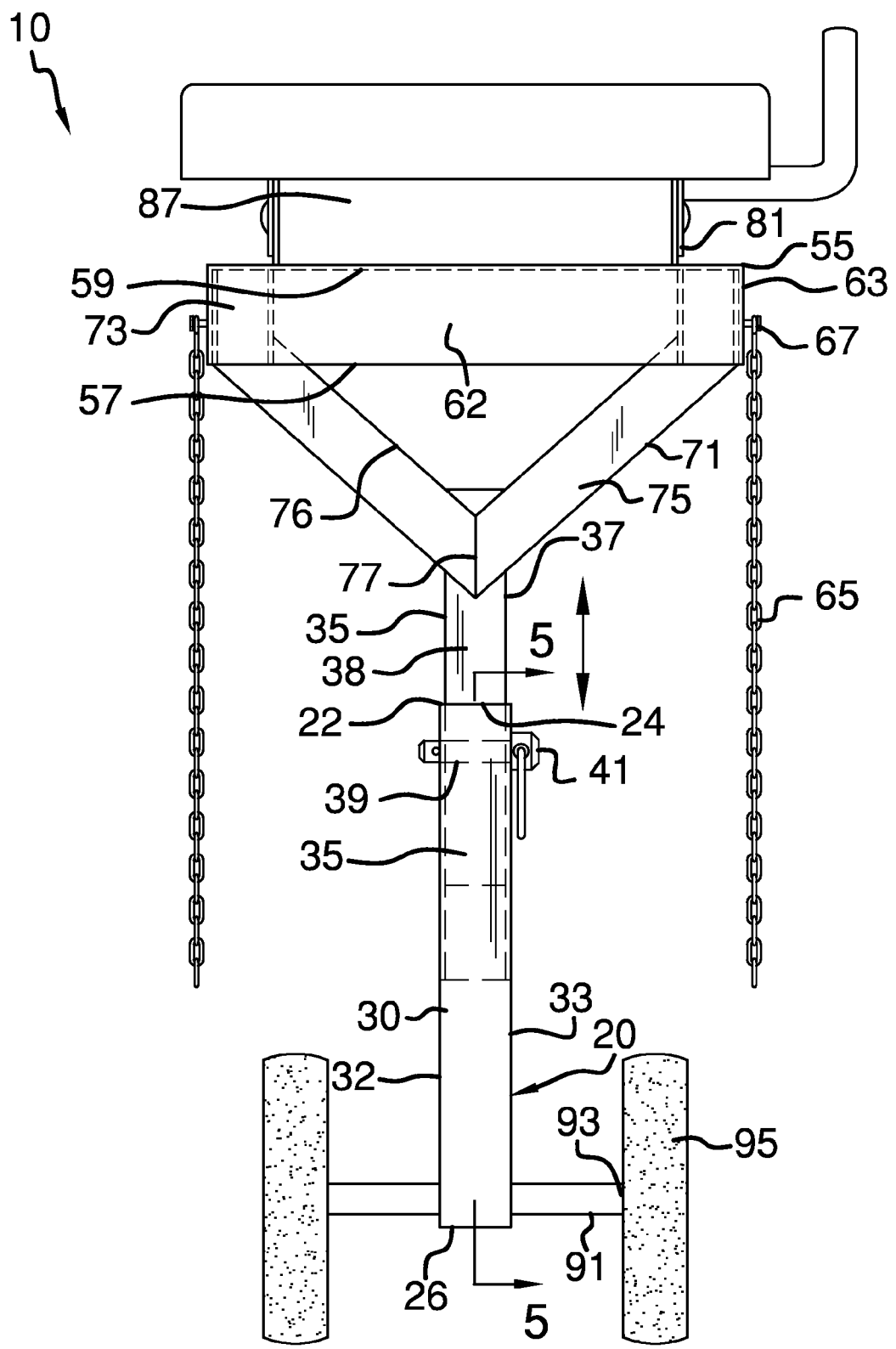
FIG. 3 is a rear elevation view.
Figure 4:
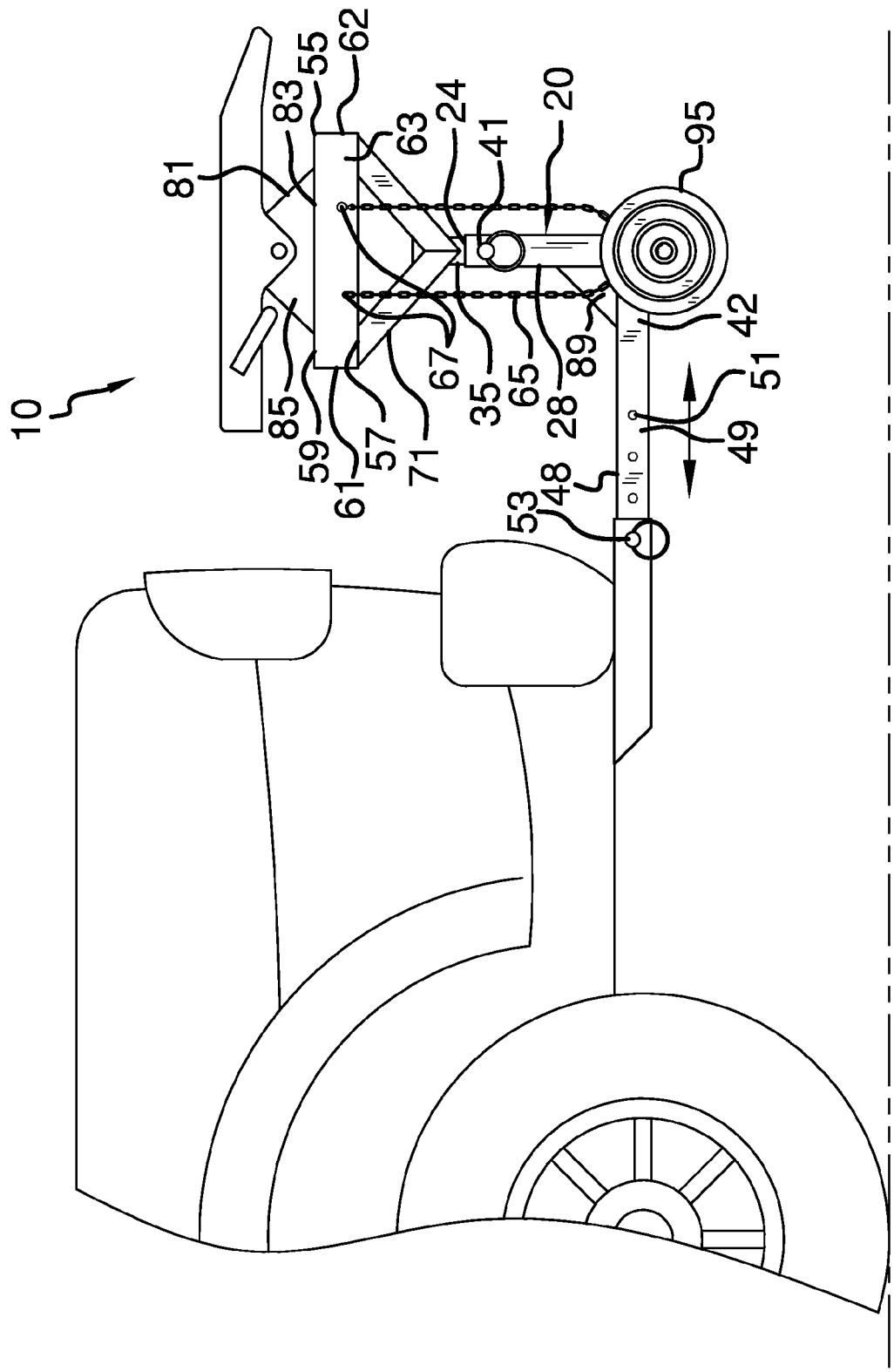
FIG. 4 is an in-use side elevation view.
Figure 5:
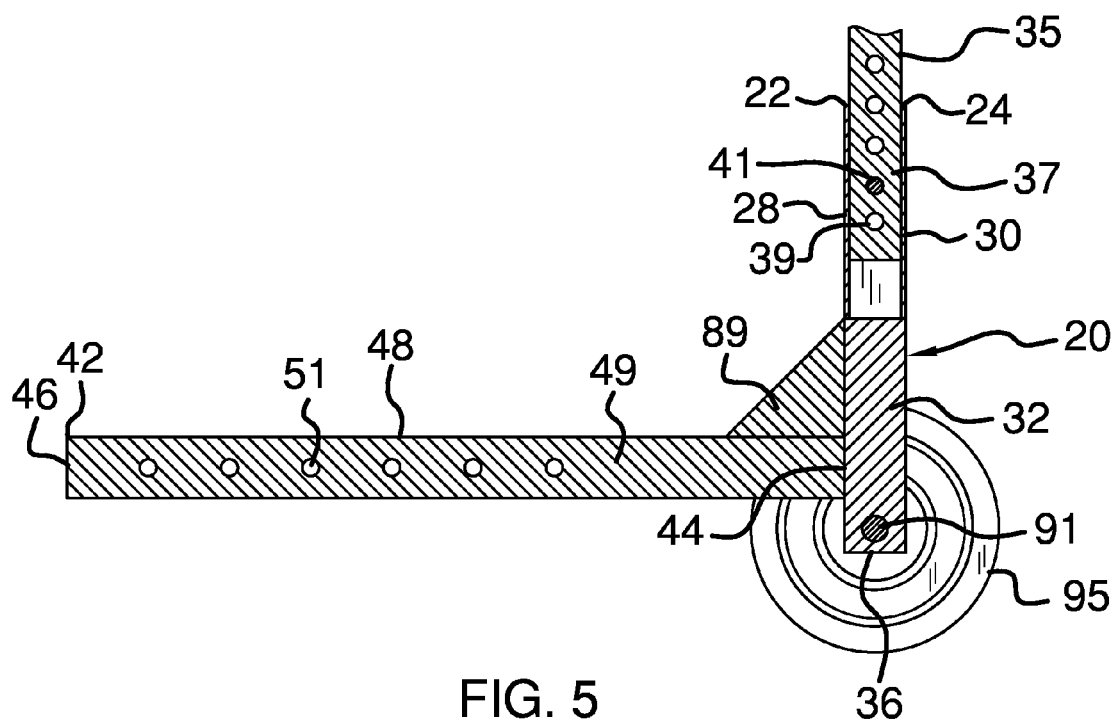
FIG. 5 is a cross-sectional view taken along line 5-5 of FIG. 3.

With reference now to the drawings, and in particular FIGS. 1 through 5 thereof, an example of the instant fifth wheel trailer hitch adapter employing the principles and concepts of the present fifth wheel trailer hitch adapter and generally designated by the reference number 10 will be described.

FIGS. 1 through 5 illustrate the present fifth wheel trailer hitch adapter 10 devised to allow a fifth-wheel hitch to be mounted outside a truck bed and inserted into a rear hitch of a vehicle so that neither the present hitch adapter 10 nor any portion of a fifth-wheel trailer occupies any portion of the truck bed. The fifth wheel trailer hitch adapter 10 includes an L-shaped support frame 20. The support frame 20 has a hollow vertical shaft 22. The vertical shaft 22 has an open top end 24, a bottom end 26, a front wall 28, a rear wall 30, a right wall 32, and a left wall 33. The support frame 20 also has a solid inner shaft 35 telescopically disposed within the vertical shaft 22. The inner shaft 35 has a pair of side walls 37 and a back wall 38. In addition, the support frame 20 includes a plurality of vertically-aligned apertures 39 centrally disposed through the side walls 37 of the inner shaft 35. A first lock pin 41 selectively engages one of the apertures 39.

A solid horizontal hitch frame 42 of the support frame 20 has a rear end 44 disposed on the front wall 28 of the vertical shaft 22 proximal the bottom end 26 and also has a front end 46, an upper wall 48, and a pair of sideward walls 49. The hitch frame 42 is perpendicular to the vertical shaft 22. A plurality of aligned holes 51 is centrally disposed in the sideward walls 49 along the hitch frame 42 with one of the holes 51 disposed proximal the front end 46. A second lock pin 53 selectively engages one of the holes 51.

In addition to the support frame 20, a parallelepiped plate 55 is disposed atop the inner shaft 35 in a position parallel to the hitch frame 42. The plate 55 has a bottom surface 57, a top surface 59, a front surface 61, a rear surface 62, and a pair of side surfaces 63. The inner shaft 35 is centrally disposed on the bottom surface 57. A safety chain 65 is attached to each of the side surfaces 63 of the plate 55. Each safety chain 65 has a pair of external ends 67 with one of the external ends 67 being permanently attached to the respective side surface 63 and an opposite one of the external ends 67 being removably attached to the respective side surface 63. A plurality of braces 71 strengthens the attachment between the inner shaft 35 and the plate 55, the braces being disposed on each of the side surfaces 63 and rear surface 62. Each brace 71 has a pair of upper ends 73 disposed within the plate 55 proximal each of the side surfaces 63. Each brace 71 further has a v-shaped portion 75 attached to the upper ends 73. The v-shaped portion 75 has a pair of inner sides 76. A lower apex 77 of the v-shaped portion 75 is disposed on the respective side wall 37 and a back wall 38 of the inner shaft 35. A cross-brace 79 is continuously disposed between the inner sides 76 of the v-shaped portion 75.

A base 81 is disposed atop the plate 55. The base 81 has a flat lower end 83 disposed on the plate 55 top surface 59, a pair of triangular side outer surfaces 85 proximal the plate 55 side surfaces 63, and a pair of parallelepiped outer walls 87 proximal the front and rear surfaces 61, 62 of the plate 55. A fifth-wheel trailer hitch assembly is configured to couple to the base 81. The fifth-wheel trailer hitch assembly has a base component attached to the base 81 and a head component configured to removably couple a fifth-wheel trailer. The base component is configured to support the head component. A solid brace wedge 89 strengthens the connection between the vertical shaft 22 and the horizontal hitch frame 42. The brace wedge 89 is disposed between the upper wall 48 of the horizontal hitch frame 42 and the front wall 28 of the vertical shaft 22. The horizontal hitch frame 42 is configured to telescopically engage a vehicle hitch assembly. The support frame 20, the plate 55, each brace 71, and the base 81 are formed of steel or other materials that will accommodate the structure and promote the functionality of the present device 10.

A single axle 91 is disposed through the right and left walls 32, 33 of the vertical shaft 22 between the hitch frame 42 and the bottom end 26. The axle 91 has a pair of outer ends 93 opposite each other. A wheel 95 is rotatingly disposed on each of the outer ends 93. The wheels 95 allow the present device 10 to be mobile to permit the device 19 to be attached to a vehicle rear hitch. Each safety chain 65 has a length configured to permit the safety chain 65 to extend proximal the respective wheel 95.

What is claimed is:
1. A fifth wheel trailer hitch adapter comprising:
   an L-shaped support frame having:
   a hollow vertical shaft having an open top end, a bottom end, a front wall, a rear wall, a right wall, and a left wall;
   a solid inner shaft telescopically disposed within the vertical shaft, the inner shaft having a pair of side walls and a back wall;
   a plurality of vertically-aligned apertures centrally disposed through the side walls of the inner shaft;
   a first lock pin selectively engaging one of the apertures;
   a solid horizontal hitch frame having a rear end disposed on the front wall of the vertical shaft proximal the bottom end and further having a front end, an upper wall, and a pair of sideward walls, the hitch frame being perpendicular to the vertical shaft;
   a plurality of aligned holes centrally disposed in the sideward walls along the hitch frame, one of the holes disposed proximal the front end;
   a second lock pin selectively engaging one of the holes;
   a single axle disposed through the right and left walls of the vertical shaft between the hitch frame and the bottom end, the axle having a pair of outer ends opposite each other;
   a wheel rotatingly disposed on each of the outer ends;
   a plate disposed atop the inner shaft in a position parallel to the hitch frame, the plate having a bottom surface, a top surface, a front surface, a rear surface, and a pair of side surfaces, the inner shaft being centrally disposed on the bottom surface;
   a safety chain attached to each of the side surfaces of the plate, each safety chain having a pair of external ends, one of the external ends being permanently attached to the respective side surface, and an opposite one of the external ends being removably attached to the respective side surface;
   a plurality of braces, one of the braces disposed on each of the side surfaces and rear surface of the plate, each brace having a pair of upper ends, each upper end disposed within the plate along each of the side surfaces, and further having a v-shaped portion attached to the upper ends, the v-shaped portion having a pair of inner sides and a lower apex disposed on each of the respective back wall and side wall of the inner shaft; and
   a base having a flat lower end disposed on the plate top surface, a pair of triangular side outer surfaces proximal the plate side surfaces, and a pair of parallelepiped outer walls proximal the front and rear surfaces of the plate, a fifth-wheel trailer hitch assembly configured to couple to the base, the fifth-wheel trailer hitch assembly having a base component attached to the base and a head component configured to removably couple a fifth-wheel trailer, the base component configured to support the head component;
   wherein the horizontal hitch frame is configured to telescopically engage a vehicle rear hitch.

2. The fifth wheel trailer hitch adapter of claim 1 further comprising a solid brace wedge disposed between the upper wall of the horizontal hitch frame and the front wall of the vertical shaft.

3. The fifth wheel trailer hitch adapter of claim 2 wherein the plate is parallelepiped.

4. The fifth wheel trailer hitch adapter of claim 3 wherein each safety chain has a length configured to permit the safety chain to extend proximal the respective wheel.

5. The fifth wheel trailer hitch adapter of claim 4 wherein the support frame, the plate, each brace, and the base are formed of steel.

6. A fifth wheel trailer hitch adapter comprising:
   an L-shaped support frame having:
   a hollow vertical shaft having an open top end, a bottom end, a front wall, a rear wall, a right wall, and a left wall;

a solid inner shaft telescopically disposed within the vertical shaft, the inner shaft having a pair of side walls and a back wall;

a plurality of vertically-aligned apertures centrally disposed through the side walls of the inner shaft;

a first lock pin selectively engaging one of the apertures;

a solid horizontal hitch frame having a rear end disposed on the front wall of the vertical shaft proximal the bottom end and further having a front end and an upper wall, the hitch frame being perpendicular to the vertical shaft;

a plurality of aligned holes centrally disposed along the hitch frame, a forward one of the holes disposed proximal the front end;

a second lock pin selectively engaging one of the holes;

a single axle disposed through the right and left walls of the vertical shaft between the hitch frame and the bottom end, the axle having a pair of outer ends opposite each other;

a wheel rotatingly disposed on each of the outer ends;

a parallelepiped plate disposed atop the inner shaft in a position parallel to the hitch frame, the plate having a bottom surface, a top surface, a front surface, a rear surface, and a pair of side surfaces, the inner shaft being centrally disposed on the bottom surface;

a safety chain attached to each of the side surfaces of the plate, each safety chain having a pair of external ends, one of the external ends being permanently attached to the respective side surface, and an opposite one of the external ends being removably attached to the respective side surface;

a plurality of braces, one of the braces disposed on each of the side surfaces and rear surface of the plate, each brace having a pair of upper ends, each upper end disposed within the plate along each of the side surfaces, and further having a v-shaped portion attached to the upper ends, the v-shaped portion having a pair of inner sides and a lower apex disposed on each of the respective back wall and side wall of the inner shaft;

a cross-brace continuously disposed between the inner sides of the v-shaped portion;

a base having a flat lower end disposed on the plate top surface, a pair of triangular side outer surfaces proximal the plate side surfaces, and a pair of parallelepiped outer walls proximal the front and rear surfaces of the plate, a fifth-wheel trailer hitch assembly configured to couple to the base, the fifth-wheel trailer hitch assembly having a base component attached to the base and a head component configured to removably couple a fifth-wheel trailer, the base component configured to support the head component; and a solid brace wedge disposed between the upper wall of the horizontal hitch frame and the front wall of the vertical shaft;

wherein the horizontal hitch frame is configured to telescopically engage a vehicle rear hitch; and wherein each safety chain has a length configured to permit the safety chain to extend proximal the respective wheel.

7. The fifth wheel trailer hitch adapter of claim 6 wherein the support frame, the plate, the brace, and the base are formed of steel.

* * * * *